US011709817B2

(12) United States Patent
Aich (10) Patent No.: US 11,709,817 B2
(45) Date of Patent: Jul. 25, 2023

(54) APPLICATION MARKETPLACE FOR TRANSPORTATION SERVICES PLATFORM

(71) Applicant: Ford Global Technologies, LLC, Dearborn, MI (US)

(72) Inventor: Sudipto Aich, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1136 days.

(21) Appl. No.: 15/917,095

(22) Filed: Mar. 9, 2018

(65) Prior Publication Data
US 2019/0278848 A1    Sep. 12, 2019

(51) Int. Cl.
| | |
|---|---|
| *G06F 16/23* | (2019.01) |
| *G06Q 50/26* | (2012.01) |
| *G06Q 50/30* | (2012.01) |
| *G06Q 10/06* | (2023.01) |
| *H04L 67/53* | (2022.01) |

(52) U.S. Cl.
CPC .......... *G06F 16/23* (2019.01); *G06Q 10/06* (2013.01); *G06Q 50/26* (2013.01); *G06Q 50/30* (2013.01); *H04L 67/53* (2022.05)

(58) Field of Classification Search
CPC .......... G06F 16/23; G06F 8/20; G06F 16/252; G06Q 10/06; G06Q 50/26; G06Q 50/30; H04L 67/20
See application file for complete search history.

(56) References Cited

U.S. PATENT DOCUMENTS

| | | | | |
|---|---|---|---|---|
| 6,085,976 | A  * | 7/2000 | Sehr ................. | G06Q 10/02 235/380 |
| 2008/0195483 | A1 * | 8/2008 | Moore ............... | G06Q 10/10 705/14.69 |
| 2012/0042008 | A1 * | 2/2012 | Christianson ...... | G06Q 30/02 709/203 |
| 2014/0018048 | A1 * | 1/2014 | Anand ............... | H04W 4/60 455/414.1 |
| 2014/0070946 | A1 * | 3/2014 | Ambrefe, Jr. ..... | G06F 3/0488 340/541 |

(Continued)

FOREIGN PATENT DOCUMENTS

WO    WO 2017/074172    5/2017

OTHER PUBLICATIONS https://web.archive.org/web/20160910040240/https://nhp.gov.in/NHPfiles/NHP%20lndradhanush%20-App%20Proposal.pdf (Year: 2016).*

(Continued)

*Primary Examiner* — Resha Desai
*Assistant Examiner* — Ismail A Manejwala
(74) *Attorney, Agent, or Firm* — David R. Stevens; Stevens Law Group (57) ABSTRACT

A transportation platform interfaces with various entities of a transportation system, which may execute instances of a common transportation operating systems. Third-party applications access data and other transportation systems subject to regulatory restrictions of a government agency. Third party applications may perform useful functions and provide interfaces to users of the transportation system or administrators. Data from third-party applications may be added to a transportation database and used by other applications, such as according to purchase agreements.

18 Claims, 5 Drawing Sheets

(56) References Cited

U.S. PATENT DOCUMENTS

| | | | |
|---|---|---|---|
| 2015/0088778 A1* | 3/2015 | Tsao | G06Q 50/265 |
| | | | 705/325 |
| 2016/0080438 A1* | 3/2016 | Liang | G06F 16/9537 |
| | | | 715/753 |
| 2016/0260157 A1 | 9/2016 | Krook | |
| 2017/0197617 A1* | 7/2017 | Penilla | H04W 4/029 |
| 2017/0220998 A1 | 8/2017 | Horn | |
| 2018/0174446 A1* | 6/2018 | Wang | G08G 1/017 |
| 2019/0144114 A1* | 5/2019 | Chen | B64C 39/024 |
| | | | 701/2 |
| 2019/0238454 A1* | 8/2019 | Celozzi | H04L 41/0806 |
| 2019/0332494 A1* | 10/2019 | Natanzon | G06F 11/1448 |

OTHER PUBLICATIONS https://web.archive.org/web/20130221140106/https://www.theglobeandmail.com/report-on-business/careers/career-advice/life-at-work/the-ups-and-downs-of-cross-border-commuting/article8301365/ (Year: 2013).* https://web.archive.org/web/20110714050702/http://www.odditysoftware.com/databases/marketplace-sell.html (Year: 2011).*

Gustaf Juell-Skielse, Is the Public Motivated to Engage in Open Data Innovation?, Nov. 23, 2016, (Year: 2016).*

* cited by examiner

APPLICATION MARKETPLACE FOR TRANSPORTATION SERVICES PLATFORM

BACKGROUND

Field of the Invention

This invention relates to public transportation vehicles and other systems for supporting public transportation.

Background of the Invention

City planners, leaders, providers of public transportation, and those who build and maintain traffic infrastructure all have an interest in promoting the safety, efficiency, and quality of transportation within a metropolitan area. However, these parties are often insular and interaction and coordination is often cumbersome or nonexistent.

The systems and methods disclosed provide an ecosystem of service offerings, city infrastructure, technology partners, implementation providers, and standards to provide city solutions that improve safety, efficiency, accessibility, and affordability.

SUMMARY

A transportation platform provides an interface to transportation systems and databases of transportation data. An application marketplace enables developers to provide applications using the interface and database and make these applications available to users of the transportation system as well as government agencies administering it. An interface to the transportation platform may further be provided to a regulatory agency for managing regulatory compliance.

The transportation platform provides services that may be accessed by the applications available in the marketplace. Services may include payment processing, contract management, data aggregation, and billing for data sharing among entities providing applications in the marketplace.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
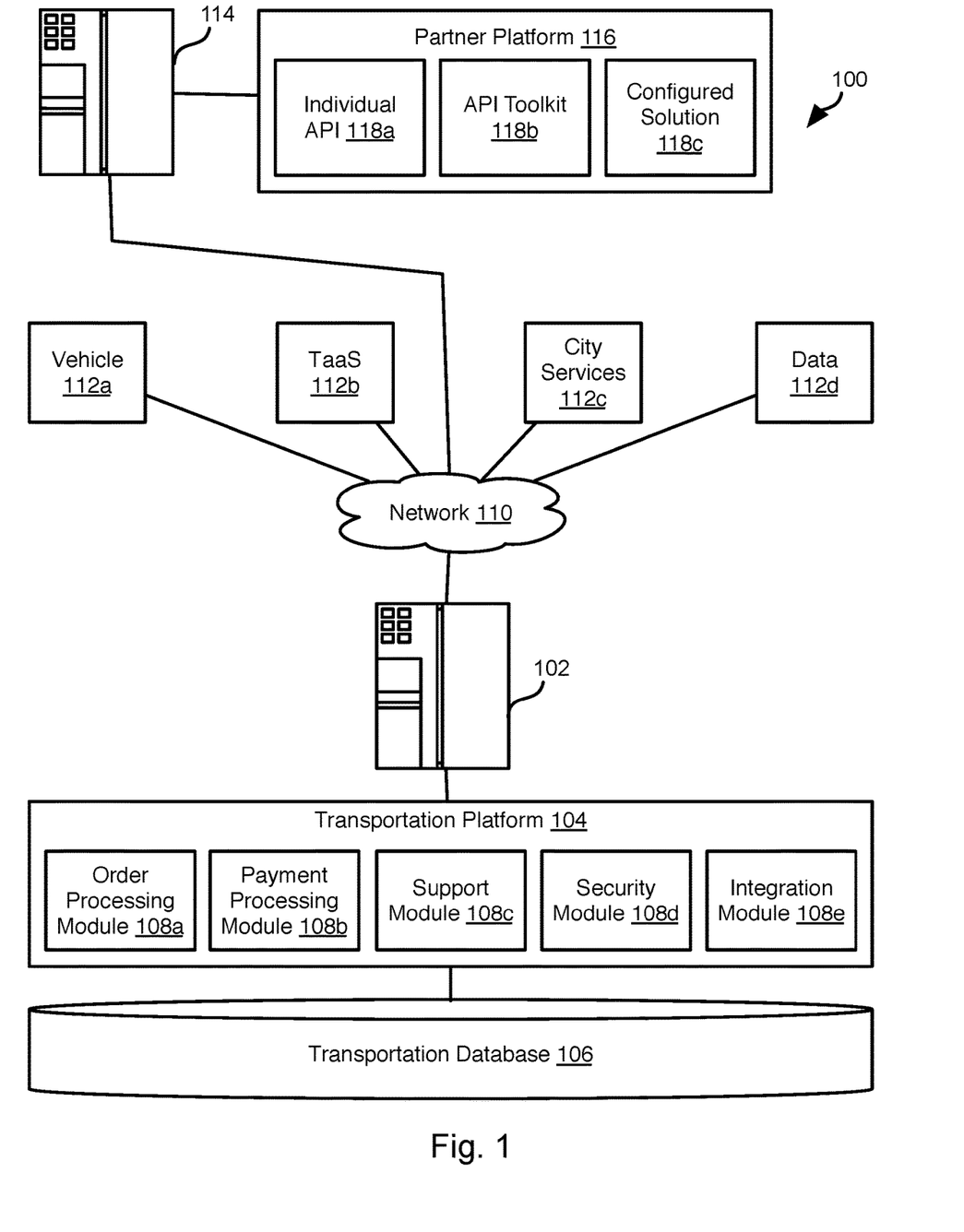
FIG. 1 is a schematic block diagram of a system for implementing a transportation platform in accordance with an embodiment of the present invention.

Referring to FIG. 1, an environment 100 may include one or more server systems 102 implementing a transportation platform 104. The transportation platform 104 provides an array of services for use by various transportation related objects and entities such as vehicles, city traffic equipment, city infrastructure, public transportation systems, taxis, buildings, and the like.

The transportation platform may collect data in a transportation database 106 and use this data for various analytical functions. For example, data relating to individual trips and usage of owner-operated vehicles, public transportation vehicles, and taxis may be stored in the transportation database 106 and used to analyze traffic patterns. Data regarding the operation of city traffic equipment, city infrastructure, buildings, and the like may also be stored in the transportation database 106.

The transportation database 106 collects a large amount of data and may be implemented and used according to any "big data" architecture known in the art, such as Hadoop, MapReduce, or any other approach known in the art.

The transportation platform 104 may implement various basic services that can be used by any of the transportation entities. For example, an order processing module 108a may enable the selection of a product or service and enable scheduling of the delivery of the product or provision of the service.

The payment processing module 108b enables the processing of payments from one party and the crediting of some or all of the payments to another party. For example, the payment processing module 108b may manage authentication of parties, secure communication among parties, and electronic processing of payments.

The support module 108c may provide one or more other services to support functioning of the transportation entities. For example, geography tracking, map data, navigation data, routing services, scheduling services, or the like.

The security module 108d may manage authenticated communication between entities and the transportation platform 104 and may also manage authentication of individual passengers. For example, the security module 108d may manage user accounts, authentication with user accounts, and encrypted communication between entities and passengers and between entities and the transportation platform 104.

The integration module 108e may manage communication among the transportation entities to facilitate the seamless provision of services among the transportation entities.

The server system 102 may be coupled to a network 110 that is in data communication with various transportation entities such as an individual vehicle 112a that is owner operated and/or operating as a taxi or limo service. The network 110 may also be coupled to a server and/or vehicles of an entity 112b implementing transportation as a service (TaaS). The network 110 may be coupled to one or more city services 112c such as a public transportation system (bus, train, subway, light rail, high speed rail, etc.) or traffic control systems (traffic light, inductive loop detection systems, traffic control circuits, etc.). City services 112c may also include computer systems of one or more emergency services (police, fire, ambulance), road maintenance services, or any other department of a city government.

The network 110 may also be coupled to one or more sources 112d of data. This data may include weather data, map data, traffic monitoring data, social media data, vehicle manufacturer data, or any other type of data that may be relevant to transportation.

As described in greater detail below, one or more transportation entities may implement or use a partner platform 116. The partner platform 116 may be executed by one of the server system 102 or by a server system 114 of an entity and coupled to the server system 102 by means of a network 110. The partner platform 116 may be implemented as a "widget" that is implemented according to an API (application programming interface) and services exposed by the transportation platform. For example, the partner platform 116 may be implemented as an application using the API and/or services.

As described in the example below, the partner platform 116 may operate in cooperation with a partner application on the mobile device of a passenger or other individual. For example, the partner platform 116 may implement one or more of individual API 118a, API toolkit 118b, and configured solution 118c that may be exposed to another partner platform 116 or be accessed by an application executing on a mobile device.

Figure 2:
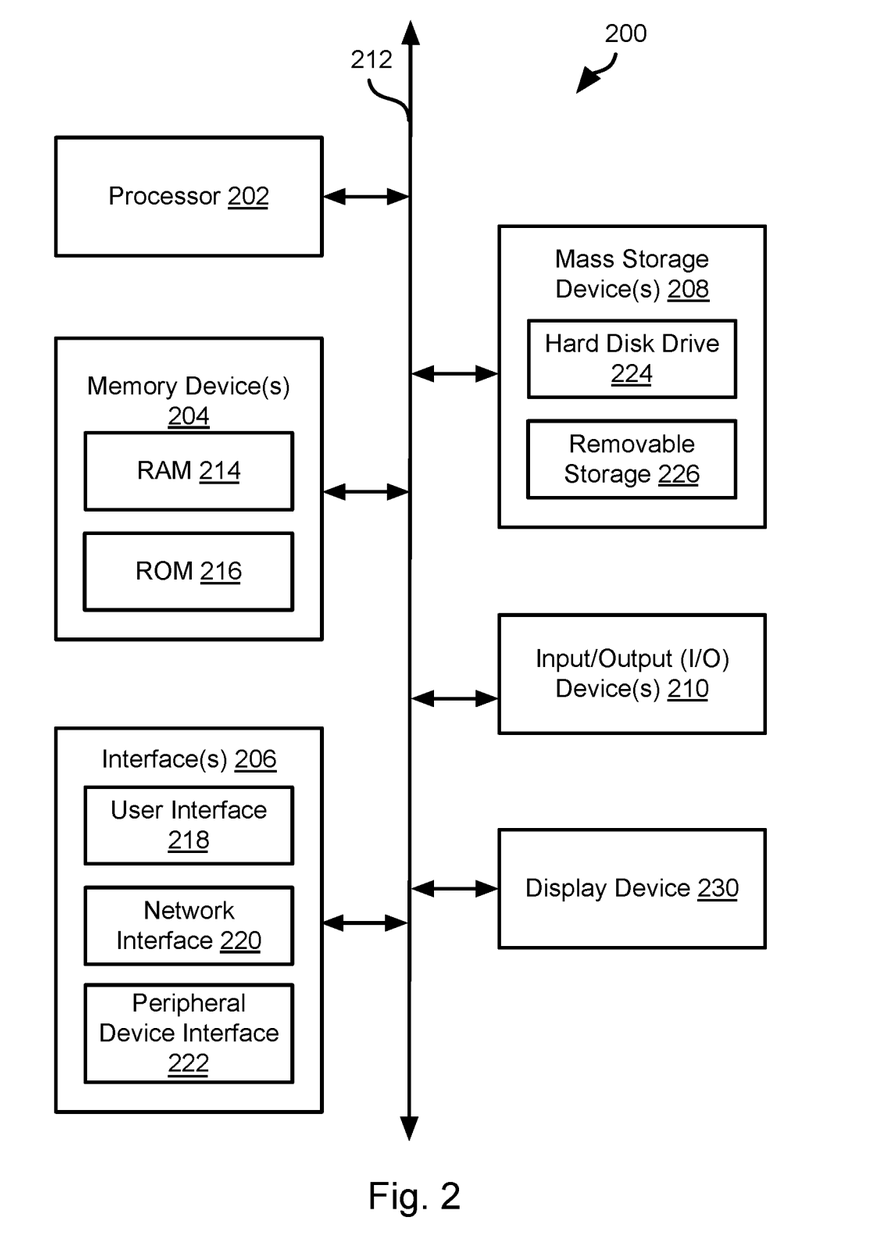
FIG. 2 is a schematic block diagram of a computer system that may be used to implement the systems and methods disclosed herein.

FIG. 2 is a block diagram illustrating an example computing device 200. Computing device 200 may be used to perform various procedures, such as those discussed herein. The server system 102, partner server system 114, vehicle, mobile device, or any of the transportation entities referred to herein may include a computing device having some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
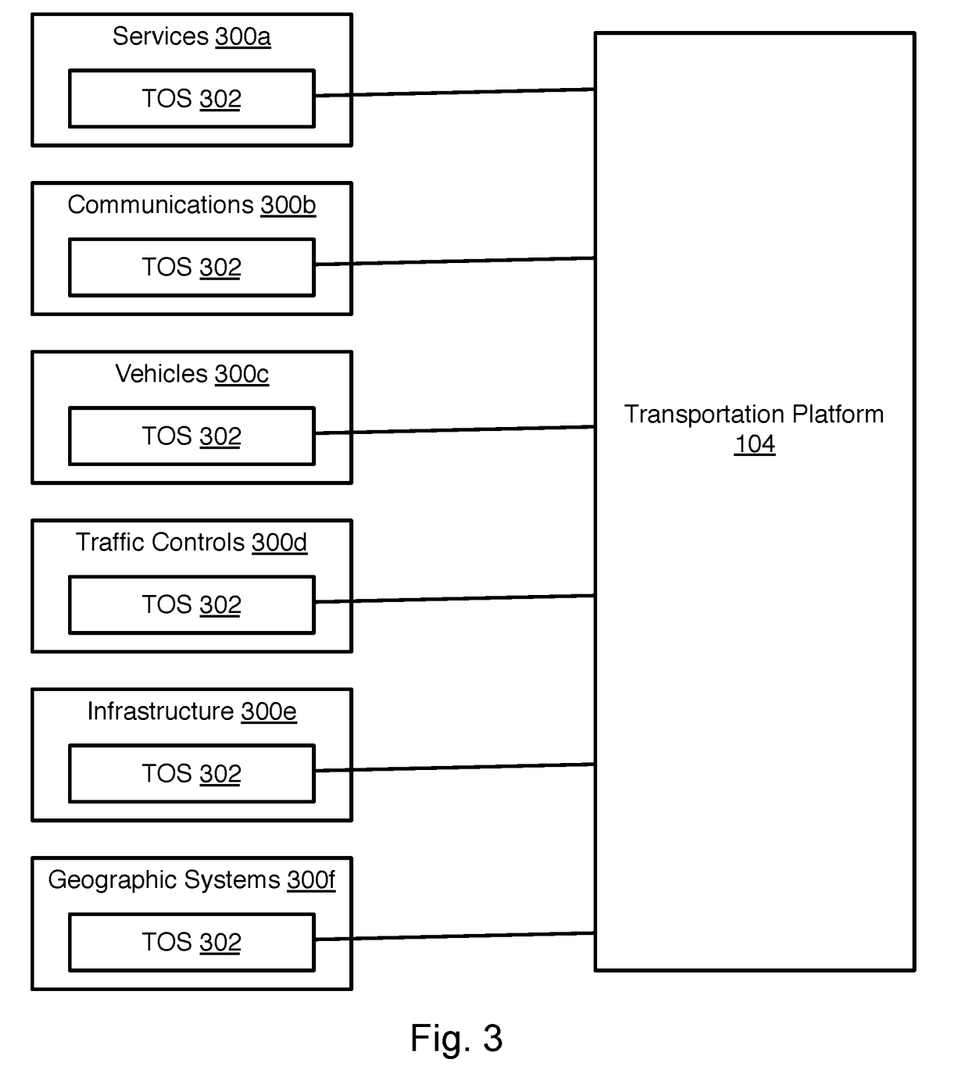
FIG. 3 is a schematic diagram illustrating use of a transportation operating system in accordance with an embodiment of the present invention.

Referring to FIG. 3, the transportation platform 104 may interact with city services 300a, communication systems 300b, vehicles 300c, traffic controls 300d, infrastructure 300e (e.g., buildings), and other geographically distributed systems 300f In particular, some or all of these systems may execute instances of a transportation operating system (TOS) 302 that implements interfaces to the various modules 108a-108e of the transportation platform 104. The TOS 302 may represent data in a consistent way across the various services 300a-300f and also implement common libraries of functions and data objects. In this manner, coordination among these services 300a-300f may be facilitated by way of the transportation platform 104 or directly among the services 300a-300f.

The TOS 302 may facilitate implementation of an ecosystem of service offerings, city infrastructure, technology partners, implementation providers, and standards to provide city solutions that improve safety, efficiency, accessibility, and affordability. The TOS 302 in combination with the transportation platform 104 may be used to provide a broad set of solutions designed to benefit the city as a partner. In particular, best-in-class partners operating together across problem areas may coordinate and communicate using the TOS 302 and transportation platform 104.

For example, the TOS 302 and transportation platform 104 may implement compliance-focused solutions in transportation in order to increase efficiency, better curb management, multi-modal journey planning, and dynamic routing (e.g., manage routing with respect to traffic lights, construction, and emergency services).

In another example, the TOS 302 and transportation platform 104 may coordinate a first mile service along with public transportation for commuters. In this manner, the accessibility of public transportation may be extended further into communities. This may also be used by corporations that need to arrange corporation for representatives and associates in cities.

In another example, safety is improved through the use of the TOS 302 and the transportation platform 104 by using cameras and sensor packages (OEM or after market) in vehicles. These systems may be used to gather and share information regarding dangerous road conditions and pedestrians. This information may be shared with the TOS 302 of other vehicles to enhance safety and pedestrian awareness. Examples, of services that may implement the TOS 302 to enhance safety include PEARL, which provides after-market camera and sensor packages; and FLIR, which provides road monitoring for dangerous conditions.

In another example, affordability is improved through the use of the TOS 302 and the transportation platform 104. As outlined below with respect to FIGS. 4-6, the TOS 302 and transportation platform 104 may be used to consolidate payment options for multiple modes of transportation. This may be used to reduce cash dependence and improve passenger convenience. Examples of entities that perform payment processing include APPLE PAY, MASTERCARD, VISA, OYSTER, and SQUARE.

Figure 4:
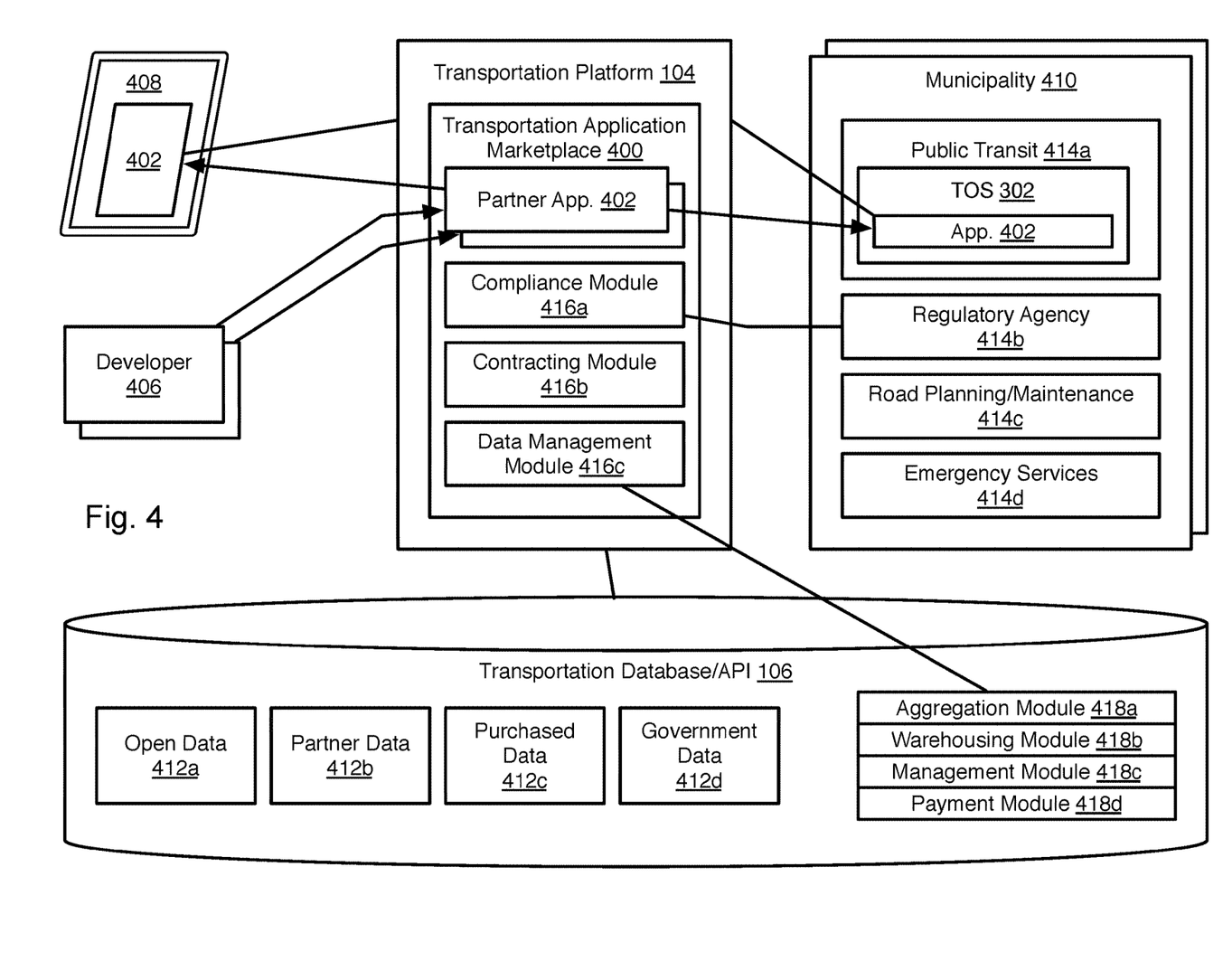
FIG. 4 is a schematic block diagram of transportation application marketplace for use with the transportation platform and transportation operating system in accordance with an embodiment of the present invention.

FIG. 4 illustrates an example use of the transportation platform 104 and TOS 302 in a transportation system of a municipality, metropolitan region, state, or other region. In the example of FIG. 4, the transportation platform 104 implements a transportation application marketplace 400 that at least one of (a) executes applications 402 from third parties ("partner applications") that are accessed by remote computer systems and (b) provides an electronic market for the purchase and downloading of third-party applications 402 by other computer systems.

The marketplace 400 therefore provides an electronic marketplace enabling developers 406 to upload applications 402, sell the applications to end users, and receive compensation. Applications may be written for and downloaded to consumer computing devices 408, such as smartphones, tablet computers, wearable computers, or the like. The applications 402 may also be downloaded by computing devices of a government 410 or government agency, such as a municipality, metropolitan region, state, or other region. The manner in which applications are uploaded, downloaded, and by which payments are processed and distributed may be according to any method known in the art of electronic commerce.

The transportation platform 104 may provide an API enabling developers 406 to access data in the transportation database 106. For example, the transportation database 106 may store open data 412a that is gathered from public sources, partner data 412b that is generated by use of the transportation platform by partner applications 402, purchased data 412c that is purchased from a commercial source or from other users of the transportation platform, and government data 412d that is received from a government agency and made available to applications 402 designed for use by that government agency, other government agencies, or the public.

The API may also provide for authenticated interaction by an application 402 with any of the entities 300a-300f executing the transportation operation system. The API may also provide interfaces for applications 402 to perform authenticated use of the modules 108a-108e implemented by the transportation platform.

In some embodiments, a computer system (e.g., a server, server farm, or desktop computer) of a government agency may execute an instance of the TOS 302. For example, a computer system 414a of a public transit system, a computer system 414b of a regulatory agency, a computer system 414c of a road planning or maintenance agency, a computer system 414d of emergency services, or any other transportation-related government agency. The partner applications 402 may be written to execute within an instance of the TOS 302 thereby providing continuity among developers 406, users of the applications 402, and other transportation entities 300a-300f that execute the TOS 302.

In view of the foregoing, it is clear that the marketplace 400 provides much more than a simple ecommerce platform for buying and selling applications. Instead, it provides a platform for the development of applications that make use of a wealth of data and functionality of a transportation system for the benefit of end users, governments, and other transportation services.

In some embodiments, the marketplace 400 may implement a compliance module 416a. The transportation system in most jurisdictions is highly regulated in order to protect public safety or protect the environment. A compliance module 416a may provide an interface to a regulatory agency 414b. The regulatory agency 414b may access this interface by executing an instance of the TOS 302, by means of a web browser, or a dedicated client application.

The compliance module 416a may regulate access to data in the transportation database 106 that may be sensitive and may restrict certain functionality by third-party applications 402. The compliance module 416a may provide an interface for government agencies to review and approve of applications prior to their availability on the transportation marketplace 400. The compliance module 416a may also impose limitations on access to data from various entities 300a-300f and any other actions with respect to entities 300a-300f that may impact public health and safety.

The marketplace 400 may also execute a contracting module 416b. In many instances, applications 402 may be specialized and therefore are unlikely to be developed absent a specific request from a government entity 410. Accordingly, the contracting module 416b may manage completion of a contract, such as the verification of stages of development, completion of development, debugging, and transfers of payments for completion of development of software. The contracting module 416b may monitor usage and manage billing and payment processing for usage-based or subscription-based payment plans.

The marketplace 400 may further implement a data management module 416c. The data management module 416c may manage the storage and retrieval of data as well as managing authentication with respect to sensitive data as well as managing billing and payment for data that is purchased or used based on payment of a subscription fee or other payment model.

In the illustrated embodiment, the data management module 416c may execute an aggregation module 418a. The aggregation module 418a may receive data from various entities 300a-300f, governments 410, computer systems 414a-414d of government agencies, and from partner applications 402. The aggregation module 418a may classify, index, and store this information such that it may be accessed by applications 402 to implement useful applications. The manner in which data is classified, indexed, and stored may be according to any data storage scheme and database implementation known in the art.

The data management module 416c may execute a warehousing module 418b that manages the storage of data aggregated by the aggregation module 418a or obtained from another source. Warehousing may include managing storage space and availability of data based on available capacity and current usage.

The data management module 416c may include a management module 418c that handles the authentication of software components accessing data and processing of data access requests in an orderly manner in order to maintain a desired quality of service.

The data management module 416c may further include a payment module 418d. The payment module 418d monitors access of data that is subject to a payment plan or subscription and manages billing based on usage by a purchasing entity and the transfer of payments to a selling entity.

Figure 5:
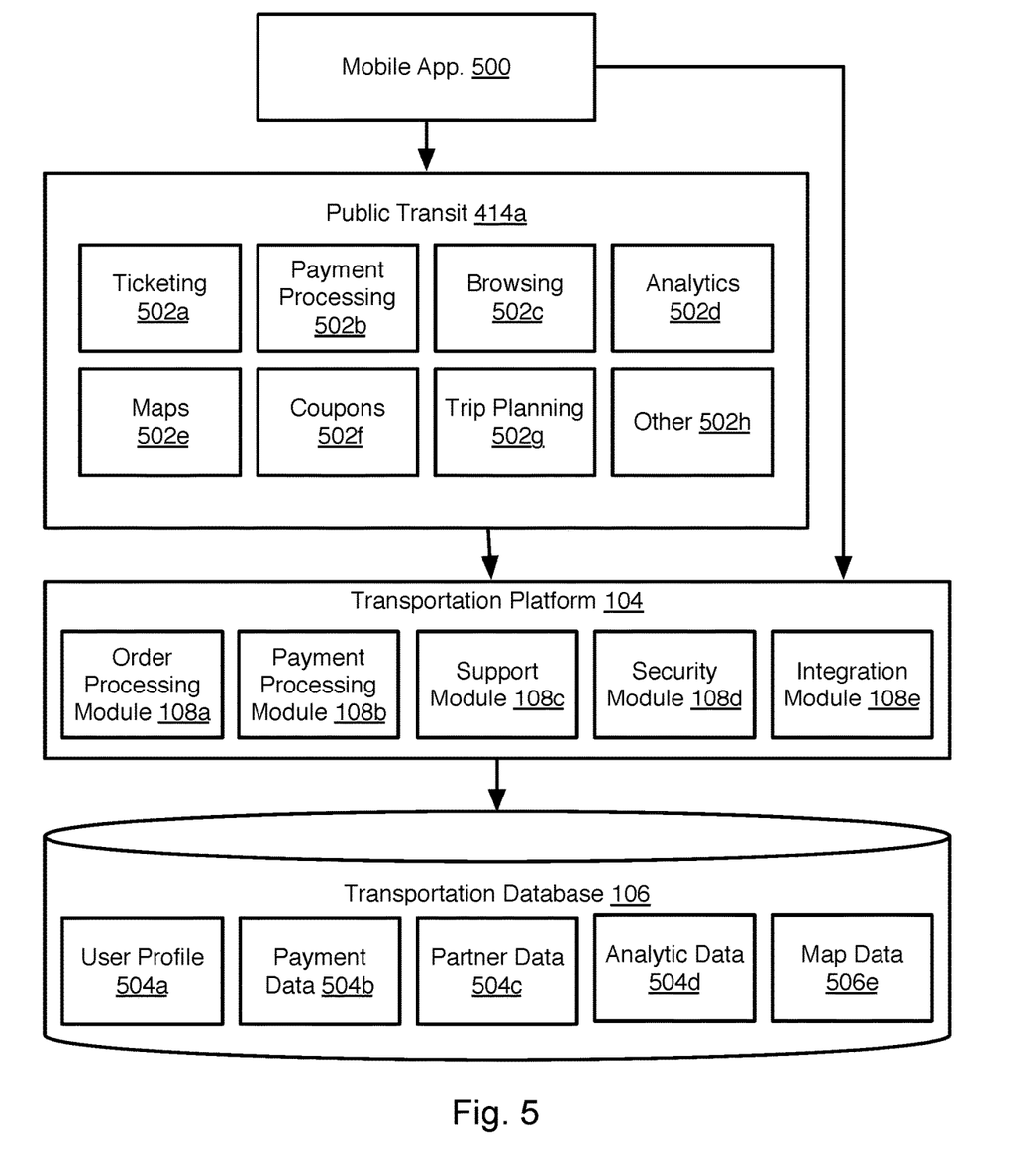
FIG. 5 is a schematic block diagram of an example partner platform implemented using the transportation application marketplace in accordance with an embodiment of the present invention.

FIG. 5 illustrates an example of the use of third-party applications 402 by a computer system 414a of a public transit provider. In the illustrated example, a third-party application 402 may be embodied as a mobile application 500 executing on a mobile phone or tablet computer of a user and obtained from the marketplace 400. The mobile application 500 may interact with the computer system 414a executing a plurality of applications 502a-502h, which may also be third-party applications obtained from the marketplace 400 and may execute within instances of the TOS 302.

The applications 502a-502h interact with the transportation platform 104 to access the transportation database 106 and to use functionality provided by the various modules 108a-108e of the transportation platform 104.

For example, a ticketing application 502a may interact with the transportation platform 104 to retrieve available ticketing options and present them on a device executing the mobile application 402. The ticketing application 502a may authenticate with the transportation platform 104 and access the user profile 504a of the user associated with the mobile application 402 in order to identify relevant travel options for the user.

A payment processing application 502b may interact with the mobile application 500 to process payment. To that end, the payment processing application 502b may authenticate with the transportation platform 104 and obtain access the user profile 504a and payment data 504b for a user of the mobile application 402 in order to process payment.

A browsing application 502c may interact with a browser implemented by mobile application 402 to provide an interface to data in the transportation database 106, such as partner data 504c or any other data described herein as being stored in the transportation database 106.

An analytics application 502d may process data in the transportation database 106 to generate summaries, identify trends, cluster data into relevant groups, or perform any analytical function known in the art in order to characterize usage or functioning of a transit system. For example, an analytics application may evaluate how much money is made from tickets or how many are bought tickets from a first location to a second location, or any other trend in transportation usage. In another example, a mobile application 402 may collect data about passenger travel that may be analyzed to provide detailed analytics for use by other applications.

The results of the analytics application 502d may be presented only to representatives of the public transit system or may be presented on the mobile application 402 as well. The results of processing by the analytics application 502d may be stored as analytic data 504d in the transportation database 106 may be used by other applications of the public transit system or the applications 402 of some other entity.

Other applications may include a maps application 502e providing navigation assistance by accessing map data 504e in the transportation database 106. Other applications may include a coupon application 502f that presents coupons and assigns rewards for usage or other desired activities, a trip planning application 502g for coordinating among multiple modes of transportation for completing a journey, and any other applications 502h that may be helpful to an administrator of a public transit system or a user of a public transit system.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
aggregating data output by one or more of owner-operated vehicles, public transportation vehicles, or taxis;
storing the aggregated data on a transportation database accessible by way of a transportation platform;
establishing an electronic application marketplace on the transportation platform that enables a user to download one or more of a plurality of third-party applications;
establishing an Application Program Interface (API) between the transportation platform and a government application executed by a computing device of a government agency;
enabling the government application to restrict software functionality for one or more of the plurality of third-party applications accessible on the electronic application marketplace; and
enabling the government application to restrict permissions to the aggregated data stored on the transportation database for at least one of the plurality of third-party applications accessible on the electronic application marketplace.

2. The method of claim 1, wherein the plurality of third-party applications accessible on the electronic application marketplace comprise at least one analytical application programmed to:
analyze at least a portion of the aggregated data stored on the transportation database to obtain analytic results; and
present a dashboard that visually presents the analytic results.

3. The method of claim 1, further comprising rendering an interface for a regulatory compliance component of the transportation platform and enabling the government application to access the regulatory compliant component.

4. The method of claim 1, further comprising storing data generated by one or more of the plurality of third-party applications accessible on the electronic application marketplace.

5. The method of claim 4, further comprising managing the sale and access of the aggregated data stored on the transportation database among third parties associated with the plurality of third-party applications.

6. The method of claim 1, further comprising managing storage and implementing privacy restrictions on the plurality of third-party applications with respect to the aggregated data stored on the transportation database.

7. The method of claim 1, wherein at least one of the plurality of third-party applications provides a commuter-oriented interface on a mobile device.

8. The method of claim 7, wherein the at least one of the plurality of third-party applications provides at least one of ticketing and trip planning services.

9. The method of claim 1, further comprising providing a contract component on the transportation platform, wherein the contract component implements one or more contracts with respect to a provider of at least one of the plurality of third-party applications and the government agency.

10. A system comprising one or more processors configured to execute instructions stored in non-transitory computer readable storage medium, the instructions comprising:
aggregating data output by one or more of owner-operated vehicles, public transportation vehicles, or taxis;
storing the aggregated data on a transportation database accessible by way of a transportation platform;
establishing an electronic application marketplace on the transportation platform that enables a user to download one or more of a plurality of third-party applications;
establishing an Application Program Interface (API) between the transportation platform and a government application executed by a computing device of a government agency;
enabling the government application to restrict software functionality for one or more of the plurality of third-party applications accessible on the electronic application marketplace; and
enabling the government application to restrict permissions to the aggregated data stored on the transportation database for at least one of the plurality of third-party applications accessible on the electronic application marketplace.

11. The system of claim 10, wherein the instructions further comprise a regulatory compliance component that enforces regulations on actions of the plurality of third-party applications taken with respect to the transportation platform and the transportation database.

12. The system of claim 10, wherein the instructions further comprise managing the sale and access of the aggregated data stored on the transportation database among third parties associated with the plurality of third-party applications.

13. The system of claim 10, wherein the instructions further comprise a data management component programmed to manage storage and implement privacy restrictions on the third-party applications with respect to the aggregated data stored on the transportation database.

14. The system of claim 10, wherein the plurality of third-party applications accessible on the electronic application marketplace comprise at least one analytical application programmed to:
analyze at least a portion of the aggregated data stored on the transportation database to obtain analytic results; and
present a dashboard that visually presents the analytic results.

15. The system of claim 10, wherein at least one of the plurality of third-party applications provides a commuter-oriented interface on a mobile device.

16. The system of claim 15, wherein the at least one of the plurality of third-party applications provides at least one of ticketing and trip planning services.

17. The system of claim 10, wherein the instructions further comprise a contract component that implements one or more contracts with respect to a provider of at least one of the plurality of third-party applications and the government agency.

18. The system of claim 10, wherein the instructions further comprise storing partner data generated by one or more of the plurality of third-party applications.

* * * * *